(12) United States Patent
Takatani et al.

(10) Patent No.: US 9,737,866 B2
(45) Date of Patent: Aug. 22, 2017

(54) MICROWAVE IRRADIATING AND HEATING DEVICE

(71) Applicant: Mitsubishi Electric Corporation, Chiyoda-ku (JP)

(72) Inventors: Yuki Takatani, Chiyoda-ku (JP); Michio Takikawa, Chiyoda-ku (JP); Yoshio Inasawa, Chiyoda-ku (JP); Takuro Sasaki, Chiyoda-ku (JP); Yukihiro Honma, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/322,598

(22) PCT Filed: Apr. 16, 2015

(86) PCT No.: PCT/JP2015/061723
§ 371 (c)(1),
(2) Date: Dec. 28, 2016

(87) PCT Pub. No.: WO2016/017218
PCT Pub. Date: Feb. 4, 2016

(65) Prior Publication Data
US 2017/0165631 A1    Jun. 15, 2017

(30) Foreign Application Priority Data

Jul. 29, 2014  (JP) .................................. 2014-153943

(51) Int. Cl.
*F27D 11/12*    (2006.01)
*H05B 6/70*    (2006.01)
(Continued)

(52) U.S. Cl.
CPC ............. *B01J 19/126* (2013.01); *F27D 11/12* (2013.01); *H05B 6/70* (2013.01); *H05B 6/806* (2013.01); *B01J 2219/1293* (2013.01)

(58) Field of Classification Search
None
See application file for complete search history.

(56) References Cited

U.S. PATENT DOCUMENTS

2008/0272114 A1  11/2008 Taguchi et al.
2014/0017156 A1   1/2014 Nagata et al.

FOREIGN PATENT DOCUMENTS

EP    0 701 862 A1    3/1996
EP    2 385 146 A1   11/2011
(Continued)

OTHER PUBLICATIONS

Written Opinion of the International Searching Authority dated Sep. 6, 2015, issued in PCT Application No. PCT/JP2015/061723 (with English translation).
(Continued)

*Primary Examiner* — Kishor Mayekar
(74) *Attorney, Agent, or Firm* — Oblon, McClelland, Maier & Neustadt, L.L.P.

(57) ABSTRACT

Disclosed is a microwave irradiating and heating device including: a reaction furnace (1) for containing a sample material (50) to be irradiated with microwave and to be heated; a polarization grid (2) provided for the reaction furnace (1); a microwave irradiating source (3) for emitting a linearly polarized microwave, the microwave irradiating source (3) being disposed outside the reaction furnace (1); and a reflector (4) for reflecting the microwave emitted from the microwave irradiating source (3) toward the reaction furnace (1) through the polarization grid (2), the reflector (4) being disposed above the reaction furnace (1), wherein the microwave irradiating source (3) is arranged in such a way
(Continued)

that the polarization direction of the reflected microwave which is made incident upon the polarization grid (2) is perpendicular to an orientation of the polarization grid (2).

8 Claims, 5 Drawing Sheets

(51) Int. Cl.
  *B01J 19/12* (2006.01)
  *H05B 6/80* (2006.01)

(56) References Cited

FOREIGN PATENT DOCUMENTS

| JP | 56-109490 A | 8/1981 |
|---|---|---|
| JP | 2008-276986 A | 11/2008 |
| JP | 2013-11384 A | 1/2013 |
| JP | 2014-15381 A | 1/2014 |
| WO | 94/26408 A1 | 11/1994 |
| WO | WO 2010/087464 A1 | 8/2010 |
| WO | 2014/054276 A1 | 4/2014 |
| WO | 2014/115704 A1 | 7/2014 |
| WO | 2016/009691 A1 | 1/2016 |
| WO | 2016/017217 A1 | 2/2016 |

OTHER PUBLICATIONS

International Search Report issued Jun. 9, 2015 in PCT/JP2015/061723 filed Apr. 16, 2015.

Sato et al., "Conceptual Design of microwave Applicators with Phased Array Antennas for Industries," The Fifth Symposium on Japan Society of Electromagnetic Wave Energy Applications, Proceedings 2B07, 2011, pp. 98-99 (2 pages).

Takikawa, Michio et al., "A Study of the Microwave Steel Manufacture System Applying Microwave Energy Transmission Technology," 2013 Institute of Electronics, Information and Communication Engineers General Conference, Proceedings B-1-13, 2013 (1 page).

MICROWAVE IRRADIATING AND HEATING DEVICE

TECHNICAL FIELD

The present disclosure relates to a microwave irradiating and heating device for heating a sample material by irradiating the sample material with microwaves.

BACKGROUND ART

In the field of microwave transmission, various researches and developments have been conducted. For example, beam control techniques using an active phased array antenna (APAA) and efficient transmission techniques have been in research and development to put solar power satellites (SPS) into practice.

Further, efforts have been made to apply microwave transmission techniques to industrial applications. For example, patent literatures 1 and 2 disclose a steel manufacturing system that manufactures molten pig iron by irradiating a raw material with a microwave and heating this raw material. Further, nonpatent literatures 1 and 2 disclose techniques for using a phased array antenna as a microwave radiation source in a steel manufacturing system that uses the microwave. Furthermore, a technique for reducing the time required for chemical reaction by applying the microwave to chemical reaction has received attention recently.

At the present time, many applications of the microwave transmission techniques are those that are applied to small-scale devices. There is a demand for development of large-scale and large-electric-power devices, such as steel manufacturing systems.

CITATION LIST

Patent Literature

Patent Literature 1: WO No. 2010/087464 entitled "Vertical Microwave Smelting Furnace."
Patent Literature 2: Japanese Unexamined Patent Application Publication No. 2013-11384 entitled "Microwave Oven."

Non Patent Literature

Non Patent Literature 1: Sato, Nagata, Shinohara, Mitani, Kashimura, "Conceptual Design of microwave Applicators with Phased Array Antennas for Industries", The Fifth Symposium on Japan Society of Electromagnetic Wave Energy Applications, Proceedings 2B07 (2011).
Non Patent Literature 2: Takigawa, Honma, Sasaki, Inasawa, Konishi, "A Study of the Microwave Steel Manufacture System Applying Microwave Energy Transmission Technology", 2013 Institute of Electronics, Information and Communication Engineers General Conference, Proceedings B-1-13 (2013).

SUMMARY OF INVENTION

Technical Problem

In the conventional microwave heating systems disclosed in patent literatures 1 and 2, and nonpatent literatures 1 and 2, microwave irradiating sources are arranged circumferentially around the reaction furnace. Thus, the microwave that is emitted from a microwave irradiating source (referred to as a "first microwave irradiating source" from here on) to the sample material, which is an object to be heated, but that is not absorbed by the sample material reflects on the sample material and is irradiated on another microwave irradiating source (referred to as a "second microwave irradiating source" from here on) that is arranged facing the first microwave irradiating source with respect to the reaction furnace. Because of this reflection, there arises a problem that a failure occurs on the second microwave irradiating source. Further, because the state of the sample material put into the reaction furnace may be various forms, such as solid, liquid, gas and powder, according to the product to be obtained, there is a problem that the sample material gets out of the reaction furnace when the reaction furnace is not equipped with lid.

The present disclosure has been made in order to solve the above-mentioned problems, and it is therefore an object of the present disclosure to provide a microwave irradiating and heating device that can confine a microwave and a sample material within the reaction furnace.

Solution to Problem

A microwave irradiating and heating device according to the present disclosure includes: a reaction furnace for containing a sample material to be irradiated with microwave and to be heated; a polarization grid provided for the reaction furnace; a microwave irradiating source for emitting a linearly polarized microwave, the microwave irradiating source being disposed outside the reaction furnace; and a reflector for reflecting the microwave emitted from the microwave irradiating source toward the reaction furnace through the polarization grid, the reflector being disposed above the reaction furnace, wherein the microwave irradiating source is arranged in such a way that the polarization direction of the reflected microwave which is made incident upon the polarization grid is perpendicular to an orientation of the polarization grid.

Advantageous Effects of Invention

Since a microwave irradiating and heating device according to the present disclosure is configured as described above, the microwave irradiating and heating device can confine the microwave and the sample material within the reaction furnace.

BRIEF DESCRIPTION OF DRAWINGS

FIG. 1 is a diagram showing the configuration of a microwave irradiating and heating device according to Embodiment 1 of the present disclosure.

FIG. 2 is a diagram showing the configuration of a microwave irradiating and heating device according to Embodiment 2 of the present disclosure.

DESCRIPTION OF EMBODIMENTS

Hereafter, preferred embodiments of the present disclosure is explained in detail with reference to the drawings.

Embodiment 1

Figure 1A:
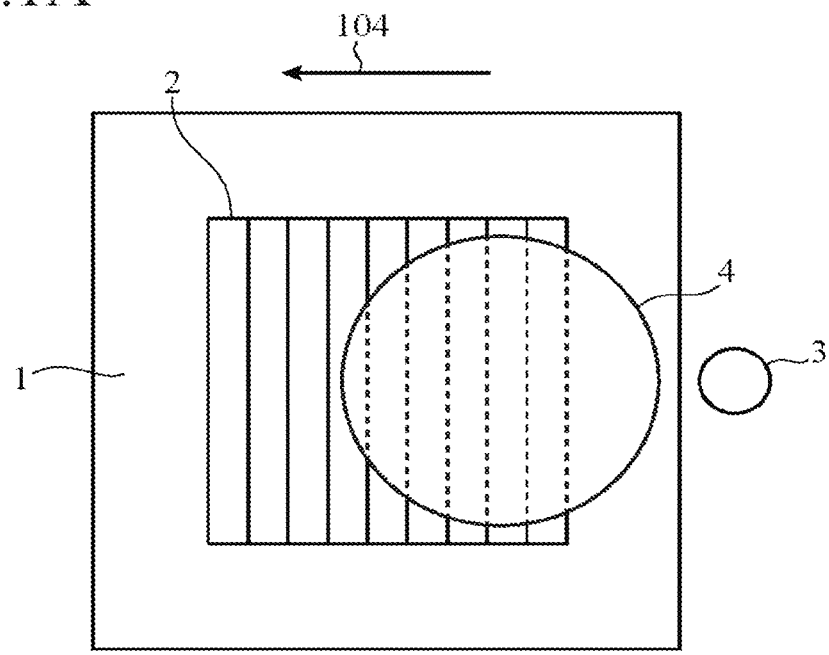
FIG. 1(a) is a top plan view and FIG. 1(b) is a sectional side view.
Figure 1B:
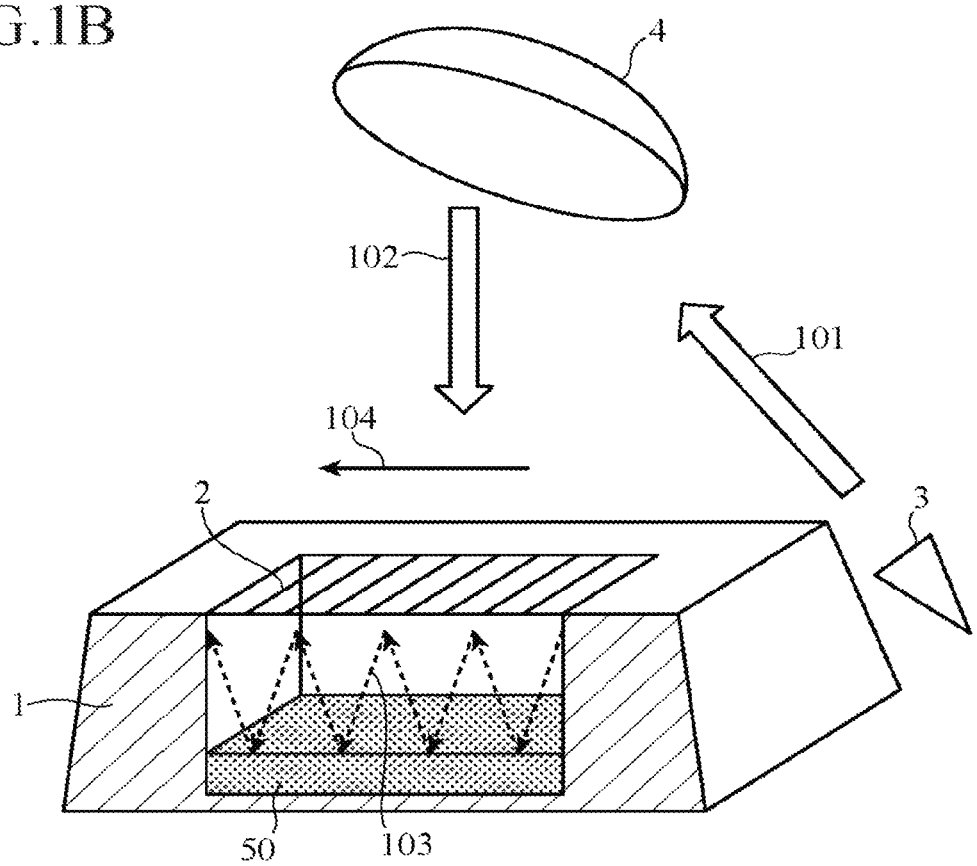

FIG. 1 is a diagram showing the configuration of a microwave irradiating and heating device according to Embodiment 1 of the present disclosure.

As shown in FIG. 1, the microwave irradiating and heating device includes a reaction furnace 1, a polarization grid 2, a microwave irradiating source 3, and a reflector 4.

The reaction furnace 1 is a housing for containing a sample material 50 and for causing the sample material 50 to be irradiated with microwave and to be reacted and heated, and has an opening on an upper side thereof (on a side facing the reflector 4). The shape of the reaction furnace 1 may be selected appropriately according to the form or characteristics of the sample material 50 to be reacted. The shape of the reaction furnace 1 which is illustrated as rectangle in FIG. 1 is not limited to the figure; the reaction furnace 1 may have any shape, for example, circle. Further, means for placing the sample material 50 in or extracting it from the reaction furnace 1, and other related matters may be selected appropriately.

The polarization grid 2 is disposed at the opening of the reaction furnace 1. As the polarization grid 2, a conductive medium, such as copper or aluminum, is used. When a linearly polarized microwave is made incident upon the boundary plane of the polarization grid 2, the microwave polarized parallel to the polarization grid 2 is reflected while the microwave polarized perpendicular passes through the polarization grid 2. Note that although in FIG. 1 the polarization grid 2 is disposed in the air around the reaction furnace 1, the position of the polarization grid 2 is not limited to the embodiment shown in FIG. 1. Any polarization grid can be used as long as it is disposed in a medium that transmits microwaves.

The microwave irradiating source 3 is disposed outside the reaction furnace 1, and emits a linearly polarized microwave to react with the sample material 50. In Embodiment 1 shown in FIG. 1, a single microwave irradiating source is illustrated. Type of the microwave irradiating source 3, frequency of emitted microwave and the like, may be selected appropriately. The direction of the microwave emitted from the microwave irradiating source 3 is a direction toward the reflector 4. The microwave irradiating source 3 is disposed in such a way that the polarization direction (denoted by a reference numeral 104 in FIG. 1) of the microwave incident upon the polarization grid 2 is perpendicular to the orientation of the polarization grid 2.

The reflector 4 is disposed above the reaction furnace 1, and reflects the linearly polarized microwave emitted from the microwave irradiating source 3 toward the reaction furnace 1 through the polarization grid 2. As indicated by an incident wave 101, the linearly polarized microwave emitted from the microwave irradiating source 3 is made incident upon the reflector 4. After that, the linearly polarized microwave reflected on the reflector 4 are made incident upon the sample material 50 through the polarization grid 2 disposed in an upper portion of the reaction furnace 1 in such a way as indicated by an incident wave 102. Although the reflector 4 is illustrated as a spheroidal mirror in FIG. 1, the shape of the reflector 4 is not limited to this embodiment. The reflector 4 may have any shape as long as it reflects microwaves.

Next, the operation of the microwave irradiating and heating device configured as above is explained.

A linearly polarized microwave emitted from the microwave irradiating source 3 proceeds toward the polarization grid 2 via the reflector 4. Since the polarization direction of the microwave is perpendicular to the orientation of the polarization grid 2 according to the present disclosure, the incident wave 102 proceeding toward the sample material 50 all passes through the polarization grid 2 and is diverged and irradiated on the sample material 50 contained within the reaction furnace 1. A part of the microwave irradiated on the sample material 50 reacts with the sample material 50 and is absorbed as heat by the sample material 50. The remaining part of the microwave which is not absorbed is reflected as a reflected wave 103 in the direction opposite to the incidence direction on to the sample material 50. When this occurs, the direction of the electric field component of the microwave rotates according to the way of arrangement and the scattering characteristics of the sample material 50. According to the present disclosure, since the polarization grid 2 is disposed on the reaction furnace 1, the microwave is reflected on the polarization grid 2 and again is irradiated on the sample material 50. As a result, the sample material 50 can be heated efficiently. Note that even if a portion of the microwave leaks out from the polarization grid 2, the amount of such leakage is very small compared with the propagation loss in the device. Therefore, such leakage does not cause the breakdown of the microwave irradiating source 3.

As explained above, in Embodiment 1, the polarization grid 2 is provided for the reaction furnace 1, and the microwave irradiating source 3 is disposed in such a way that the polarization direction of the microwave is perpendicular to the orientation of the polarization grid 2. Thus, the microwave irradiating and heating device according to Embodiment 1 can confine the microwave and the sample material 50 within the reaction furnace 1. As a result, failures can be prevented from occurring in the microwave irradiating source 3, and the sample material 50 can be prevented from getting out. In addition, since the microwave can be confined within the reaction furnace 1, the microwave reflected on the sample material 50 can be used effectively within the reaction furnace 1, that is, be irradiated again on the sample material 50. Thus, there is provided an advantageous effect of improving the efficiency of energy.

Embodiment 2

Figure 2A:
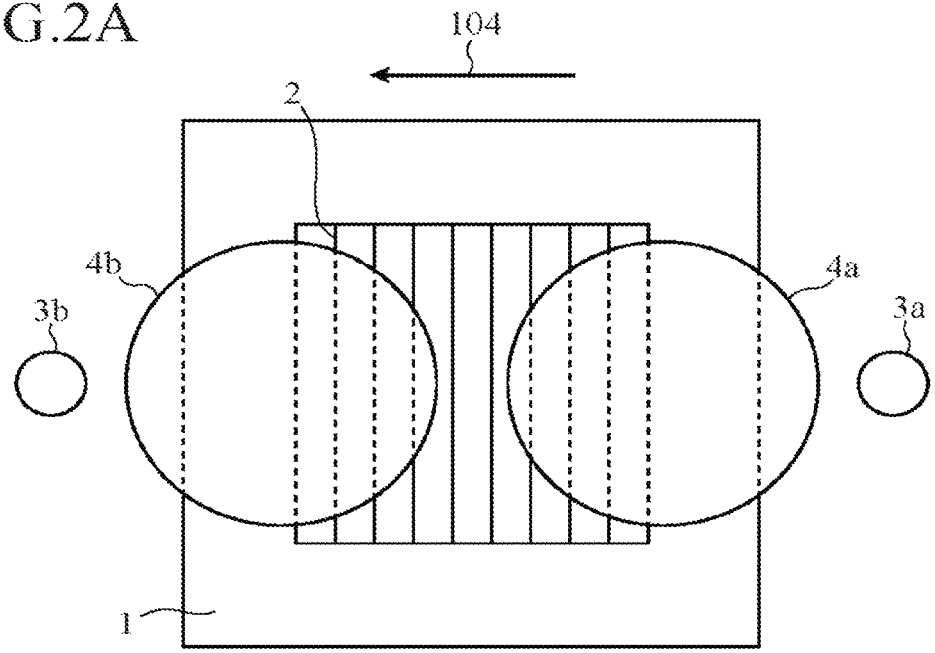
FIG. 2(a) is a top plan view and FIG. 2(b) is a sectional side view.
Figure 2B:
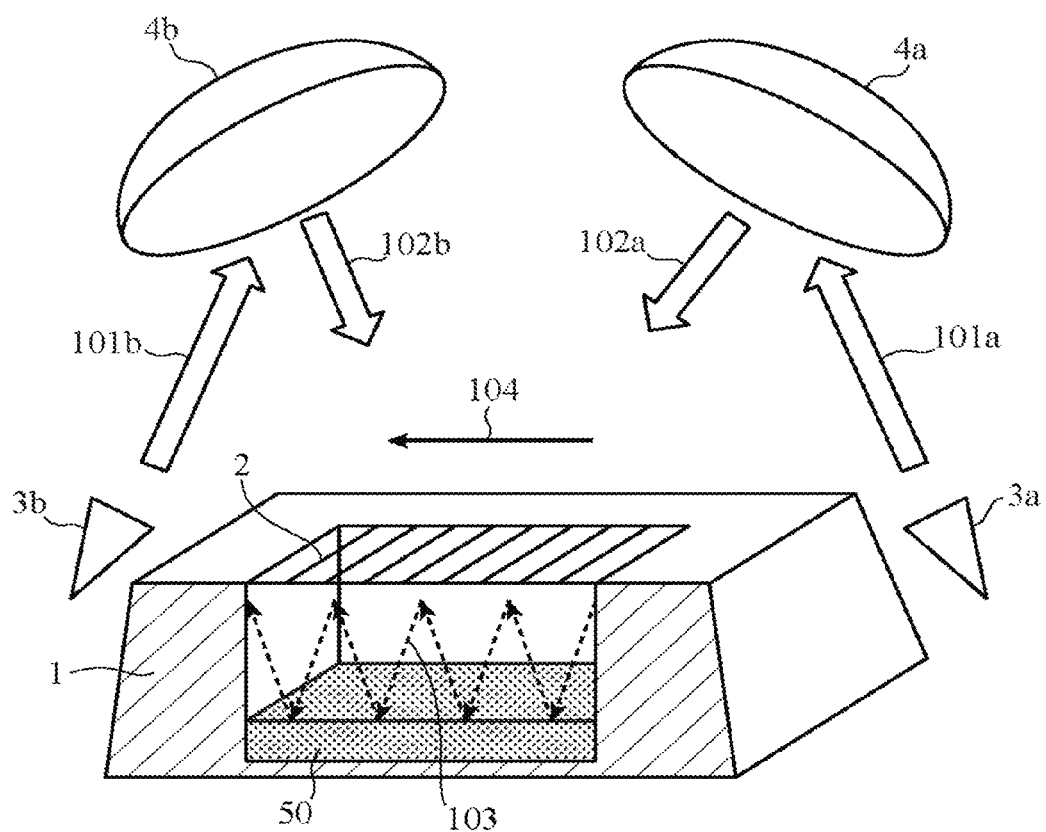

FIG. 2 is a diagram showing the configuration of a microwave irradiating and heating device according to Embodiment 2 of the present disclosure. The microwave irradiating and heating device according to Embodiment 2 shown in FIG. 2 is composed of two systems each including the microwave irradiating source 3 and the reflector 4, provided for the microwave irradiating and heating device according to Embodiment 1 as shown in FIG. 1. In order to distinguish between the systems in the diagram, suffix symbols (a, b) are attached to the reference numerals denoting the components of the systems, respectively. Because the other components are the same as those according to Embodiment 1, explanation of the other components is omitted by denoting them with the same reference numerals.

The microwave irradiating source 3 in each system is disposed in such a way that the polarization direction of the microwave incident upon the polarization grid 2 is perpendicular to the orientation of the polarization grid 2.

Although the embodiment shown in FIG. 2 is composed of two systems each including the microwave irradiating source 3 and the rotated quadric surface mirror 4, the number of the systems is not limited to two. There may be provided three or more systems.

As explained above, a plurality of systems is provided as described above in accordance with Embodiment 2, advantageous effects similar to those of Embodiment 1 are obtained.

Embodiment 3

Figure 3:
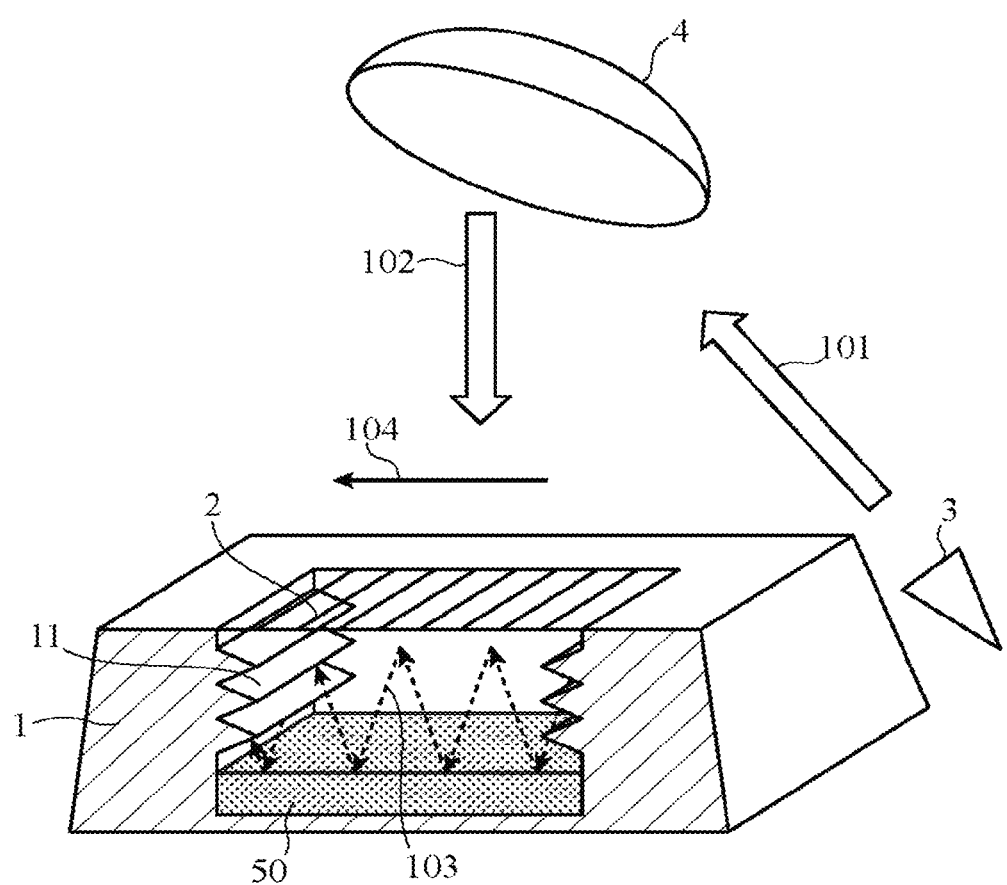
FIG. 3 is a sectional side view showing the configuration of a microwave irradiating and heating device according to Embodiment 3 of the present disclosure.

FIG. 3 is a diagram showing the configuration of a microwave irradiating and heating device according to Embodiment 3 of the present disclosure.

In the microwave irradiating and heating device according to Embodiment 3 shown in FIG. 3, a rugged portion 11 is provided on the inner side walls of the reaction furnace 1 of the microwave irradiating and heating device according to the Embodiment 1 shown in FIG. 1. Because the other components are the same as those according to Embodiment 1, explanation of the other components is omitted by denoting them with the same reference numerals.

The rugged portion 11 is provided on the inner side walls of the reaction furnace 1, and reflects irregularly the microwave that is reflected within the reaction furnace 1. The material, shape, or type of the rugged portion 11 may be selected appropriately. By providing the rugged portion 11, the reflected microwave 103 from the sample material 50 reflects more complicatedly and more times within the reaction furnace 1 than the configuration according to Embodiment 1 shown in FIG. 1. As a result, there is provided an advantageous effect that the amount of the microwave leakage from the polarization grid 2 is reduced.

Note that the rugged portions 11 may have, for example, the form of a plane on which triangular prisms are arranged, or a plane on which triangular pyramids, pyramids or semi-spheres are arranged. That is, the rugged portion may have any shapes that provide the advantageous effect of reflecting and diffusing the microwave.

By providing the rugged portion 11 on the inner side walls of the reaction furnace 1, as described above, there are provided advantageous effects of heating the sample material 50 more efficiently and of reducing the leakage of the microwave from the polarization grid 2 according to Embodiment 3, in addition to those provided according to Embodiment 1.

In the above description the case in which the rugged portion 11 is applied to the configuration according to Embodiment 1 shown in FIG. 1 is shown. The rugged portion 11 may be applied similarly to the configuration according to Embodiment 2 shown in FIG. 2, which provides the same or similar advantageous effects.

Embodiment 4

Figure 4:
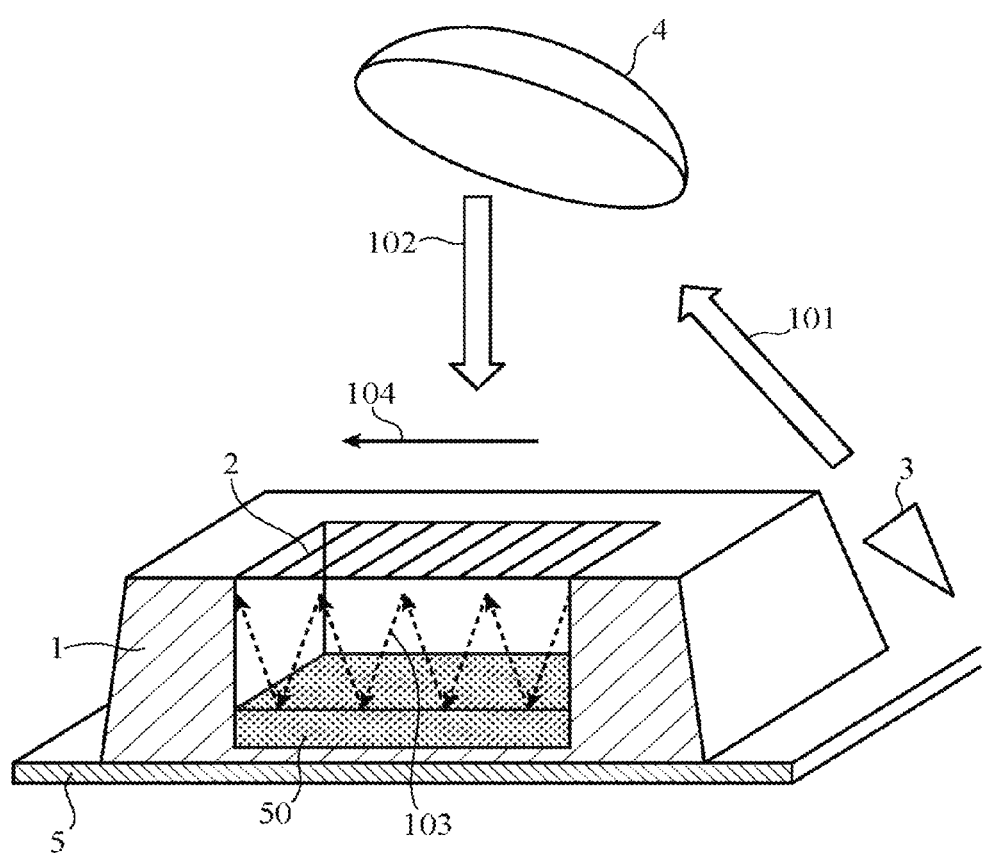
FIG. 4 is a sectional side view showing the configuration of a microwave irradiating and heating device according to Embodiment 4 of the present disclosure.

FIG. 4 is a diagram showing the configuration of a microwave irradiating and heating device according to Embodiment 4 of the present disclosure.

In the microwave irradiating and heating device according to Embodiment 4 shown in FIG. 4, a heater 5 is provided to the microwave irradiating and heating device according to Embodiment 1 shown in FIG. 1. Because the other components are the same as those according to Embodiment 1, explanation of the other components is omitted by denoting them with the same reference numerals.

The heater 5 is arranged outside the reaction furnace 1, and is used to heat the reaction furnace 1. A method of heating or type of the heater 5 may be selected appropriately. In addition to heating the sample material 50 with the microwave, heating the reaction furnace 1 with the heater 6 increases the temperature within the reaction furnace 1. As a result, the reaction rate of the sample material 50 is improved.

As described above, since the microwave irradiating and heating device according to this Embodiment 4 includes the heater 5 for heating the reaction furnace 1, an advantageous effect of heating the sample material 50 more efficiently is obtained, in addition to the advantageous effects provided by Embodiment 1.

In the above description the case in which the heater 5 is applied to the configuration according to Embodiment 1 shown in FIG. 1 is shown. The heater may be applied similarly to the configuration according to Embodiment 2 or 3 shown in FIG. 2 or 3, respectively. In this case, the same or similar advantageous effects are provided.

Embodiment 5

Figure 5:
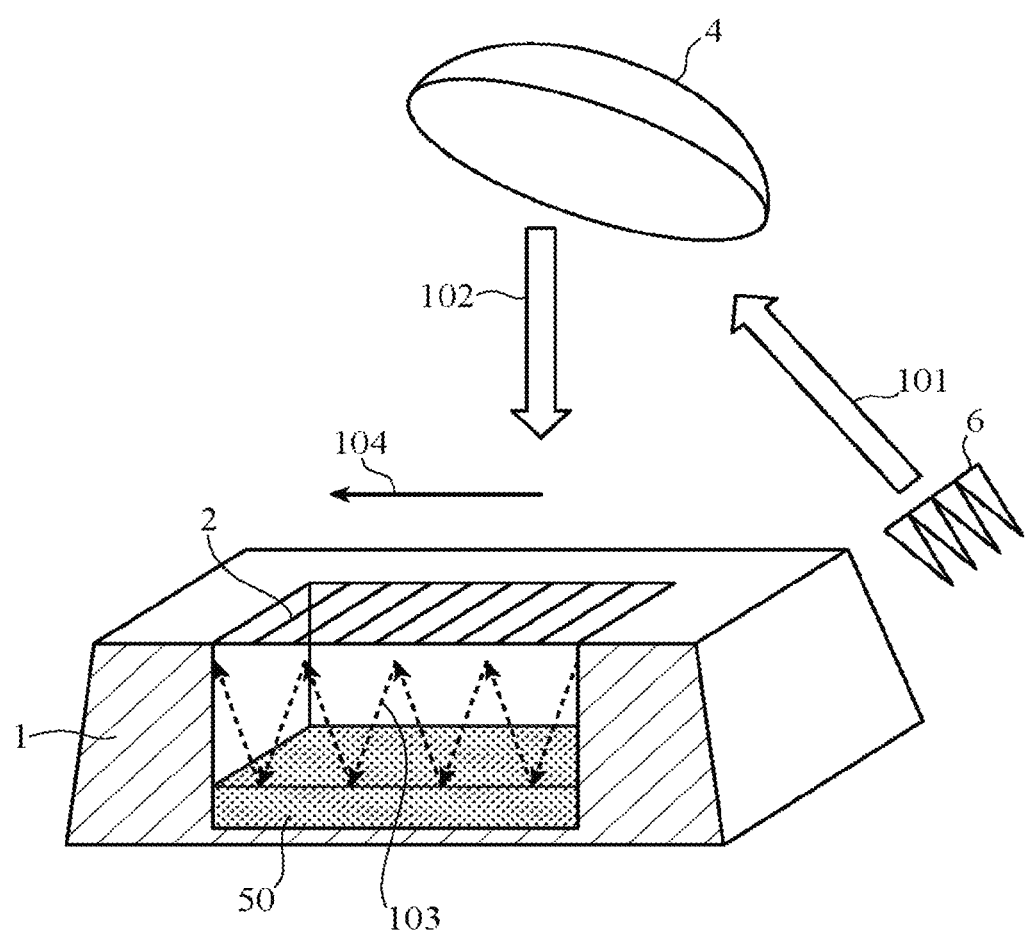
FIG. 5 is a sectional side view showing the configuration of a microwave irradiating and heating device according to Embodiment 5 of the present disclosure.

FIG. 5 is a diagram showing the configuration of a microwave irradiating and heating device according to Embodiment 5 of the present disclosure.

In the microwave irradiating and heating device according to Embodiment 5 shown in FIG. 5, the microwave irradiating source 3 of the microwave irradiating and heating device according to Embodiment 1 shown in FIG. 1 is embodied as an active phased array antenna 6. Because the other components are the same as those according to Embodiment 1, explanation of the other components is omitted by denoting them with the same reference numerals.

The active phased array antenna 6 includes amplifiers and phase shifters, each set of an amplifier and a phase shifter is provided for each antenna element or sub-array antenna having antenna elements. By optimizing amplification amount of each of the amplifiers and phase amount of each of the phase shifters, the irradiation distribution of the microwave irradiated on the sample material 50 can be flexibly controlled. Amplification amounts and phase amounts may be adjusted appropriately to attain a target irradiation distribution.

As described above, in the microwave irradiating and heating device according to Embodiment 7, since the active phased array antenna 6 that can adjust freely the amplitude and the phase of the emitted microwave is used as the microwave irradiating source 3, there is provided an advantageous effect of being able to control flexibly a microwave irradiation distribution to the sample material 50, in addition to the advantageous effects provided by Embodiment 1.

In the above description the case in which the active phased array antenna 6 is applied to the configuration according to Embodiment 1 shown in FIG. 1 is shown. The active phased array antenna may be applied similarly to the configuration according to any of Embodiments 2 to 4 shown in FIGS. 2 to 4, which provides the same or similar advantageous effects.

While the disclosure has been described in its preferred embodiments, it is to be understood that combination, modification or omission of parts of embodiments described above may be made within the scope of the disclosure.

INDUSTRIAL APPLICABILITY

A microwave irradiating and heating device according to the present disclosure includes: a reaction furnace for containing a sample material to be irradiated with microwave and to be heated; a polarization grid provided for the reaction furnace; a microwave irradiating source for emitting a linearly polarized microwave, the microwave irradiating source being disposed outside the reaction furnace; and a reflector for reflecting the microwave emitted from the microwave irradiating source toward the reaction furnace through the polarization grid, the reflector being disposed above the reaction furnace, wherein the microwave irradiating source is arranged in such a way that the polarization direction of the reflected microwave which is made incident upon the polarization grid is perpendicular to an orientation of the polarization grid. Thus, the microwave irradiating and heating device can confine the microwave and the sample material within the reaction furnace and is suitable for heating sample materials.

REFERENCE SIGNS LIST

1 reaction furnace, 2 polarization grid, 3, 3a, 3b microwave irradiating source, 4, 4a, 4b reflector, 5 heater, 6 active phased array antenna, 11 rugged portion, 50 sample material, 101, 101a, 101b incident wave, 102, 102a, 102b incident wave, 103 reflected wave, and 104 polarization direction of microwave.

The invention claimed is:

1. A microwave irradiating and heating device comprising:
   a reaction furnace for containing a sample material to be irradiated with microwave and to be heated;
   a polarization grid provided for the reaction furnace;
   a microwave irradiating source for emitting a linearly polarized microwave, the microwave irradiating source being disposed outside the reaction furnace; and
   a reflector for reflecting the microwave emitted from the microwave irradiating source toward the reaction furnace through the polarization grid, the reflector being disposed above the reaction furnace,
   wherein the microwave irradiating source is arranged in such a way that a polarization direction of the reflected microwave which is made incident upon the polarization grid is perpendicular to an orientation of the polarization grid.

2. The microwave irradiating and heating device according to claim 1, further comprising a rugged portion for reflecting irregularly the microwave, the rugged portion being provided on an inside wall of the reaction furnace.

3. The microwave irradiating and heating device according to claim 1, further comprising a heater disposed outside the reaction furnace for heating the reaction furnace.

4. The microwave irradiating and heating device according to claim 1, wherein the microwave irradiating source is an active phased array antenna that can adjust freely an amplitude and phase of the microwave emitted therefrom.

5. A microwave irradiating and heating device comprising:
   a reaction furnace for containing a sample material to be irradiated with microwave and to be heated;
   a polarization grid provided for the reaction furnace;
   a plurality of microwave irradiating sources for emitting a linearly polarized microwave, the microwave irradiating source being disposed outside the reaction furnace; and
   a plurality of reflectors, each of the plurality of reflectors being provided correspondingly to each of the plurality of microwave irradiating sources, being disposed above the reaction furnace, and being for reflecting the microwave emitted from the corresponding microwave irradiating source toward the reaction furnace through the polarization grid,
   wherein each of the microwave irradiating sources is arranged in such a way that a polarization direction of the reflected microwave which is made incident upon the polarization grid is perpendicular to an orientation of the polarization grid.

6. The microwave irradiating and heating device according to claim 5, further comprising a rugged portion for reflecting irregularly the microwave, the rugged portion being provided on an inside wall of the reaction furnace.

7. The microwave irradiating and heating device according to claim 5, further comprising a heater disposed outside the reaction furnace for heating the reaction furnace.

8. The microwave irradiating and heating device according to claim 5, wherein the microwave irradiating source is an active phased array antenna that can adjust freely an amplitude and phase of the microwave emitted therefrom.

* * * * *